(12) United States Patent  
Fetchko et al.

(10) Patent No.: US 10,370,070 B2
(45) Date of Patent: Aug. 6, 2019

(54) COMBINATION TRIM TAB AND INTERCEPTOR FOR A MARINE VESSEL

(71) Applicant: MARINE CANADA ACQUISITION INC., Richmond (CA)

(72) Inventors: Eric B. Fetchko, Burnaby (CA); Davor Baros, Vancouver (CA); Art Ferguson, Glenview, IL (US)

(73) Assignee: Marine Canada Acquisition Inc., Richmond, British Columbia (CA)

(*) Notice: Subject to any disclaimer, the term of this patent is extended or adjusted under 35 U.S.C. 154(b) by 0 days.

(21) Appl. No.: 15/982,592

(22) Filed: May 17, 2018

(65) Prior Publication Data

US 2018/0334230 A1  Nov. 22, 2018

Related U.S. Application Data

(60) Provisional application No. 62/507,393, filed on May 17, 2017.

(51) Int. Cl.
*B63B 1/22* (2006.01)
*B63B 39/06* (2006.01)

(52) U.S. Cl.
CPC .................. *B63B 39/061* (2013.01)

(58) Field of Classification Search
CPC .. B63B 39/06; B63B 39/061; B63B 2039/061
USPC .................................. 114/284–286
See application file for complete search history.

(56) References Cited

U.S. PATENT DOCUMENTS

| 4,967,682 | A | 11/1990 | O'Donnell |
| 6,006,689 | A | 12/1999 | Olofsson |
| 7,013,825 | B1 | 3/2006 | D'Alessandro |
| 7,311,059 | B2 * | 12/2007 | Loui ............... B63B 1/322 114/288 |
| 8,387,551 | B2 | 3/2013 | Müller |
| 8,480,445 | B2 * | 7/2013 | Morvillo ............ B63B 39/00 440/40 |

(Continued)

FOREIGN PATENT DOCUMENTS

WO  WO2011099931 A1  8/2011

OTHER PUBLICATIONS

Written Opinion dated Jul. 19, 2018 for corresponding PCT/CA2018/050585.

(Continued)

*Primary Examiner* — Daniel V Venne
(74) *Attorney, Agent, or Firm* — Berenato & White, LLC

(57) ABSTRACT

A combination trim tab and interceptor comprises a housing and a trim tab pivotably coupled to the housing. An interceptor blade is reciprocatingly received by the housing. A cam is coupled to the trim tab and the interceptor blade. The cam is coupled to the trim tab by a link which applies a rotary force when the trim tab pivots relative to the housing. The cam is coupled to the interceptor blade such that the interceptor blade functions as a cam follower. An actuator actuates the trim tab to pivot relative to the housing. Pivoting of the trim tab results in the cam applying a force to the interceptor blade, causing the interceptor blade to reciprocate relative to the housing. The cam may be configured so a stroke of the interceptor blade and a stroke of the actuator are non-linear. The actuator may be an electromechanical linear actuator.

15 Claims, 8 Drawing Sheets

(56) References Cited

U.S. PATENT DOCUMENTS 9,274,528 B2 * 3/2016 Wilson ................. G05D 1/0875
9,409,636 B2    8/2016 Keuning
9,914,503 B2 * 3/2018 Huyge ..................... B63B 1/22

OTHER PUBLICATIONS

International Search Report for PCT/CA2018/050585 dated Jul. 19, 2018.

* cited by examiner

COMBINATION TRIM TAB AND INTERCEPTOR FOR A MARINE VESSEL

CROSS-REFERENCE TO RELATED APPLICATIONS AND CLAIM TO PRIORITY

This application is related to application No. 62/507,393, filed May 17, 2017 in the United States of America, the disclosure of which is incorporated herein by reference and to which priority is claimed.

FIELD OF THE INVENTION

The present invention relates to trim tabs and interceptors for marine vessels and, in particular, to a combination trim tab and interceptor for a marine vessel.

BACKGROUND OF THE INVENTION

Conventional trim tabs comprise angularly deployable tabs mounted on a transom of a marine vessel. The tabs are angularly deployed upwardly and downwardly relative to the marine vessel to provide lift in order to compensate for changes in marine vessel speed and weight distribution. Hydrodynamic forces acting on the tabs result in an upward pressure which raises the stern and lowers the bow of the marine vessel.

Conventional interceptors comprise vertically deployable blades mounted on a transom of a marine vessel. The blades are vertically deployed upwardly and downwardly relative to the marine vessel to provide lift in order to compensate for changes in marine vessel speed and weight distribution. Hydrodynamic forces acting on the blades result in an upward pressure which raises the stern and lowers the bow of the marine vessel.

U.S. Pat. No. 8,387,551 which issued on Mar. 5, 2013 to Müller discloses a double trim tab for a marine vessel. The double trim tab comprises a bottom tab, a flow interceptor and an actuator. The bottom tab is configured for mounting to the marine vessel. The flow interceptor is pivotally mounted at an upper side of the bottom tab to pivot toward and away from the bottom tab about a first laterally-extending axis. The flow interceptor includes a flow interceptor end extending toward the bottom tab to overlap one of a forward edge and a rear edge of the bottom tab extending generally laterally between outer longitudinal sides of the bottom tab. The actuator is connected to the flow interceptor and configured for mounting to the marine vessel for upwardly and downwardly pivoting the flow interceptor between a raised position with the flow interceptor end above a bottom surface of the bottom tab, and a lowered position with the flow interceptor end extending below the bottom surface of the bottom tab.

SUMMARY OF THE INVENTION

There is provided a combination trim tab and interceptor comprising a housing, a trim tab pivotably coupled to the housing, and an interceptor blade reciprocatingly received by the housing. A link couples the trim tab to the interceptor blade. There is an actuator which actuates the trim tab to pivot relative to the housing. Pivoting of the trim tab relative to the housing results in the link applying a force to the interceptor blade, causing the interceptor blade to reciprocate relative to the housing. The link may be pivotably connected to the trim tab and may also be pivotably connected to the interceptor blade so the interceptor blade moves upwardly when the trim tab is pivoted upwardly by the actuator and the interceptor blade moves downwardly when the trim tab is pivoted downwardly by the actuator.

There is accordingly also provided a combination trim tab and interceptor comprising a housing, a trim tab pivotably coupled to the housing, and an interceptor blade reciprocatingly received by the housing. A cam is coupled to the trim tab and the interceptor blade. The cam is coupled to the trim tab by a link which applies a rotary force to the cam when the trim tab pivots relative to the housing. The cam is coupled to the interceptor blade in a manner such that the interceptor blade functions as a cam follower. There is an actuator which actuates the trim tab to pivot relative to the housing. Pivoting of the trim tab relative to the housing results in the cam applying a force to the interceptor blade, causing the interceptor blade to reciprocate relative to the housing. The cam may be configured so a stroke of the interceptor blade and a stroke of the actuator are non-linear. The cam may have a cam track and the interceptor blade may be coupled to the cam by a pin which travels along the cam track. The cam track may be an upwardly concave, curved slot. The actuator may be an electromechanical linear actuator.

There is accordingly further provided a marine vessel with a combination trim tab and interceptor mounted on a transom thereof. The combination trim tab and interceptor comprises a housing, a trim tab pivotably coupled to the housing, and an interceptor blade reciprocatingly received by the housing. A link couples the trim tab to the interceptor blade. There is an actuator which actuates the trim tab to pivot relative to the housing. Pivoting of the trim tab relative to the housing results in the link applying a force to the interceptor blade, causing the interceptor blade to reciprocate relative to the housing. There may be a cam coupled to the trim tab by the link and the link may apply a rotary force to the cam when the trim tab pivots relative to the housing. The link may be pivotably connected to the trim tab and may also be pivotably connected to the interceptor blade so the interceptor blade moves upwardly when the trim tab is pivoted upwardly by the actuator and the interceptor blade moves downwardly when the trim tab is pivoted downwardly by the actuator. The cam may be coupled to the interceptor blade in a manner such that the interceptor blade functions as a cam follower. The cam may be configured so a stroke of the interceptor blade and a stroke of the actuator are non-linear. The cam may be mounted on the transom of the marine vessel. The cam may have a cam track and the interceptor blade may be coupled to the cam by a pin which travels along the cam track. The cam track may be an upwardly concave, curved slot. The actuator may be an electromechanical linear actuator.

BRIEF DESCRIPTION OF THE DRAWINGS

The invention will be more readily understood from the following description of the embodiments thereof given, by way of example only, with reference to the accompanying drawings, in which.

DESCRIPTION OF THE PREFERRED EMBODIMENT(S)

Figure 1:
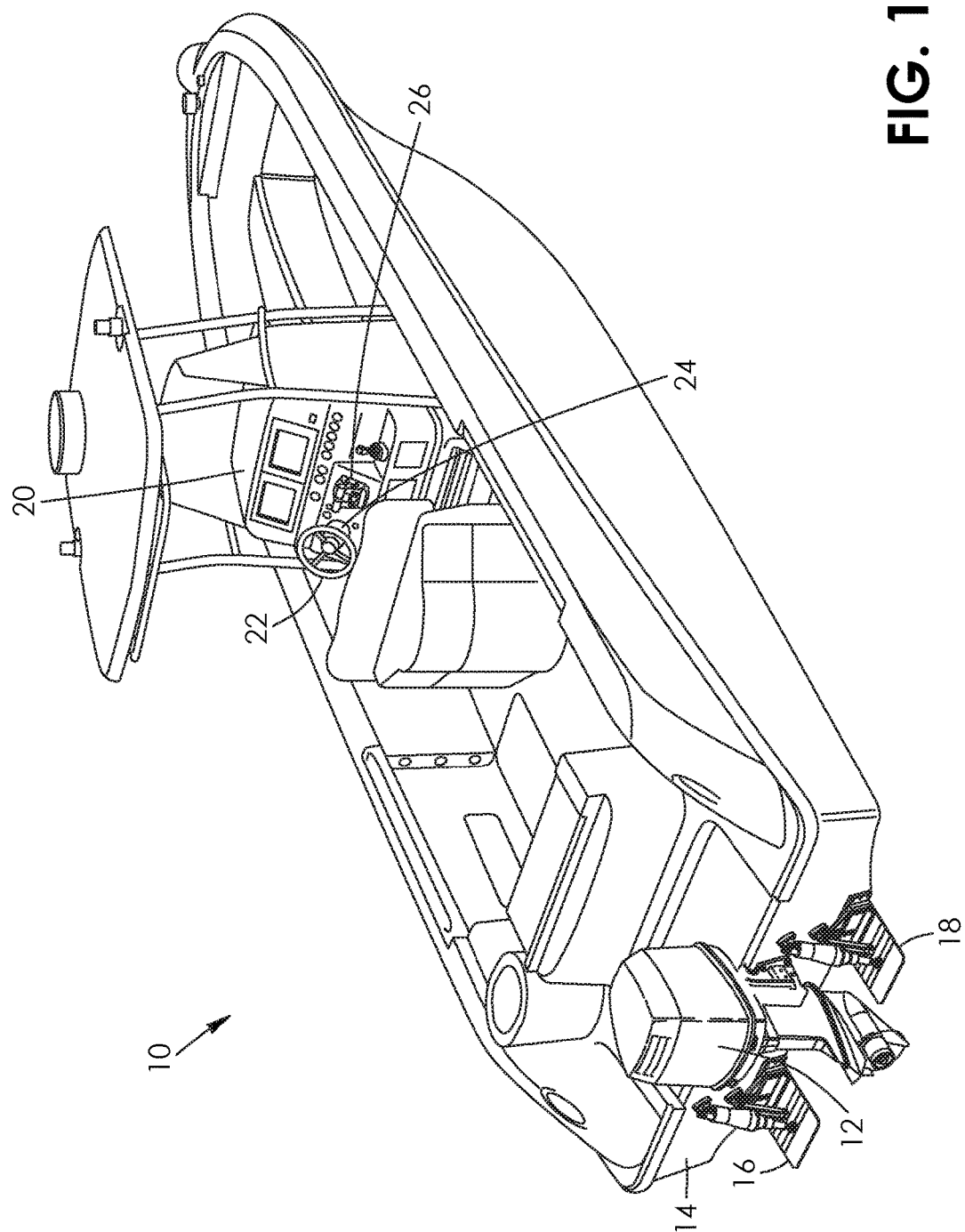
FIG. 1 is a perspective view of a marine vessel provided with a combination trim tab and interceptor showing the trim tab in an upward position relative to the marine vessel.

Referring to the drawings and first to FIG. 1, there is shown a marine vessel 10 which is provided with a propulsion unit in the form of a single outboard engine 12 mounted on a transom 14 of the marine vessel 10. However, in other examples, the marine vessel may be provided with any suitable number of outboard and/or inboard engines. It is common to see two engines and practically up to five engines in pleasure marine vessels. The marine vessel 10 is also provided with a port combination trim tab and interceptor 16 and a starboard combination trim tab and interceptor 18. The port combination trim tab and interceptor 16 and the starboard combination trim tab and interceptor 18 are each mounted on the transom 14 of the marine vessel 10 in a conventional manner.

Figure 2:
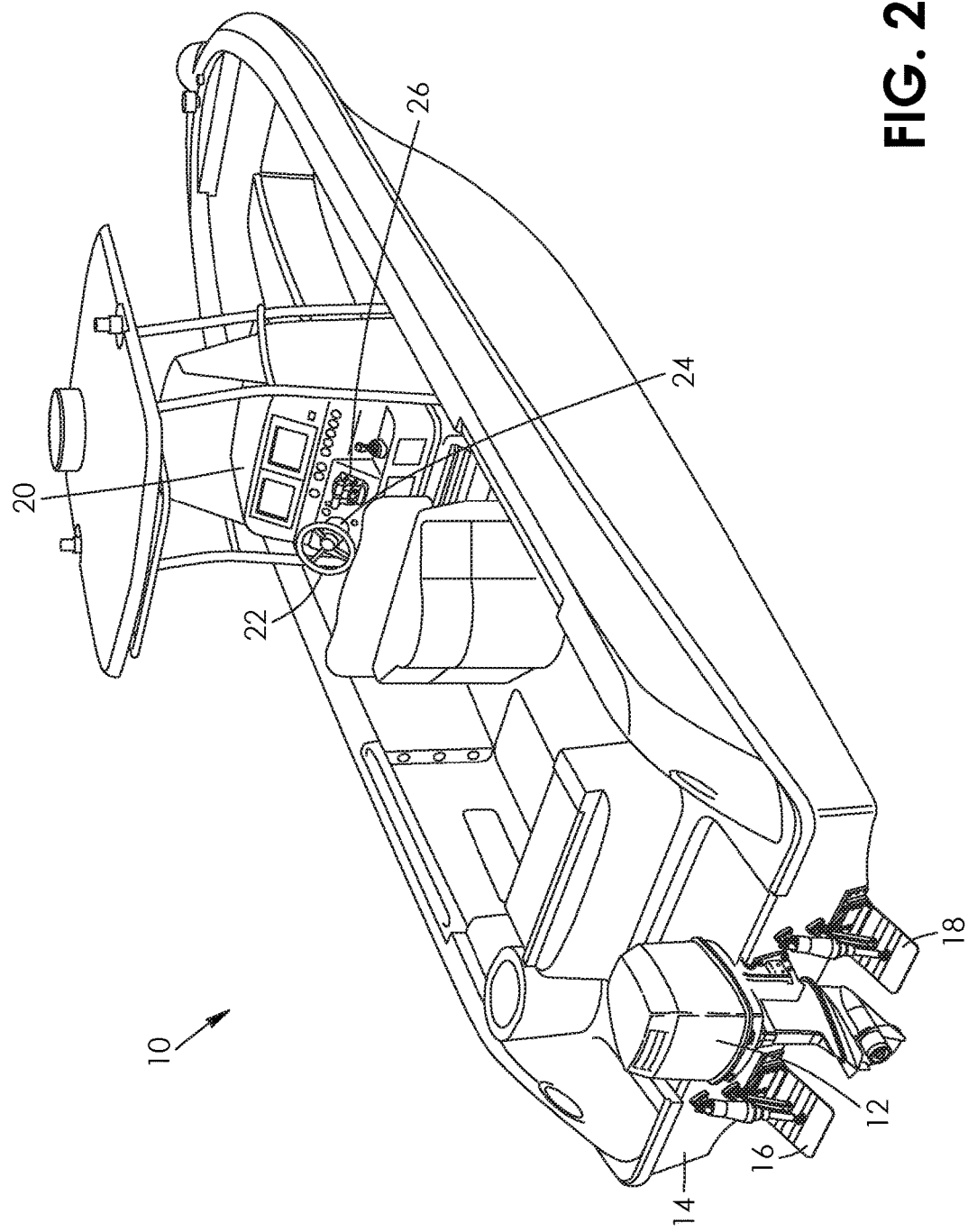
FIG. 2 is another perspective view of the marine vessel provided with the combination trim tab and interceptor showing the trim tab in a downward position relative to the marine vessel.

There is a control station 20 on the marine vessel that supports a steering wheel 22 mounted on a helm 24. The steering wheel 22 is conventional and is used to steer the outboard engine 12. The control station 20 also supports a control head 26 which is used to control the shift and throttle functions of the outboard engine 12. The control head 26 is also used to adjust a position of the port combination trim tab and interceptor 16 and the starboard combination trim tab and interceptor 18 relative to the marine vessel 10. The port combination trim tab and interceptor 16 and the starboard combination trim tab and interceptor 18 can each be independently or synchronously deployed upwardly and downwardly relative to the marine vessel 10. More specifically, the port combination trim tab and interceptor 16 and the starboard combination trim tab and interceptor 18 are deployable upwardly and downwardly relative to the marine vessel 10 between an upward position, shown in FIG. 1, and a downward position shown in FIG. 2. In other examples, other controls including but not limited to buttons, joysticks, levers and even automatic controls based on inputs from sensors, may be used to deploy the port combination trim tab and interceptor 16 and the starboard combination trim tab and interceptor 18.

Figure 3:
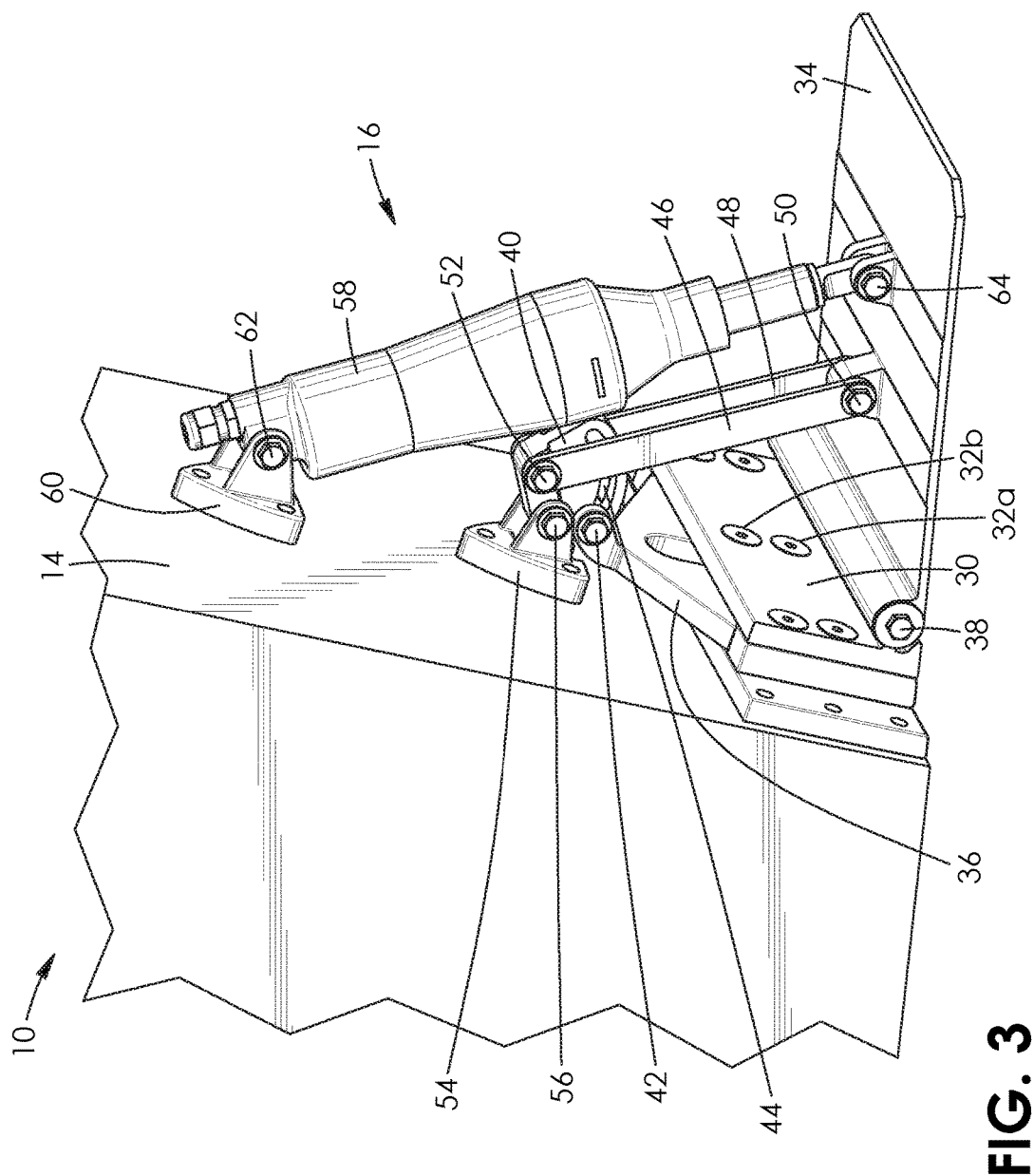
FIG. 3 is a perspective view of the combination trim tab and interceptor mounted on a transom of the marine vessel.

The port combination trim tab and interceptor 16 and the starboard combination trim tab and interceptor 18 are substantially identical or mirror images thereof. Accordingly, only the port combination trim tab and interceptor 16 is described in detail herein with the understanding that the starboard combination trim tab and interceptor 18 has a substantially identical structure or a mirror image structure. The port combination trim tab and interceptor 16 is shown in greater detail in FIG. 3 and includes a housing 30 which is mounted on the transom 14 of the marine vessel 10. The housing 30 has a plurality of lateral openings, for example lateral openings 32a and 32b, extending therethrough. There is a substantially planar trim tab 34 pivotably coupled to the housing 30 and an interceptor blade 36 reciprocatingly received by the housing 30. The trim tab 34 is pivotably coupled to the housing 30 by a pivot pin 38 and the interceptor blade 36 is coupled to a cam 40 which imparts linear motion to the interceptor blade 36. This causes the interceptor blade 36 to be reciprocatingly received by the housing 30, i.e. the interceptor blade 36 functions as a cam follower. In this example, the interceptor blade 36 is coupled to the cam 40 by a pin 42 which travels along a cam track 44 as the cam 40 pivots. In this example, the cam track 44 is an upwardly concave, curved slot.

The cam 40 is also coupled to the trim tab 34 by links 46 and 48. The links 46 and 48 are both pivotably connected to the trim tab 34 by a pivot pin 50 and the links 46 and 48 are both fixedly connected to the cam 40 by a fixed pin 52. In this example, the cam 40 is mounted on the transom 14 of the marine vessel 10 using a mount 54. The cam 40 is pivotably connected to the mount 54 by a pivot pin 56. There is an actuator 58 which imparts a force to the trim tab 34 so that the trim tab 34 pivots relative to the housing 30. In this example, the actuator 58 is an electromechanical linear actuator mounted on the transom 14 of the marine vessel 10 using a mount 60. The actuator 58 is pivotably connected to the mount 60 by a pivot pin 62 and the actuator 58 is pivotably connected to the trim tab 34 by a pivot pin 64. In other examples, any suitable actuator may be employed to actuate the trim tab.

Figure 4:
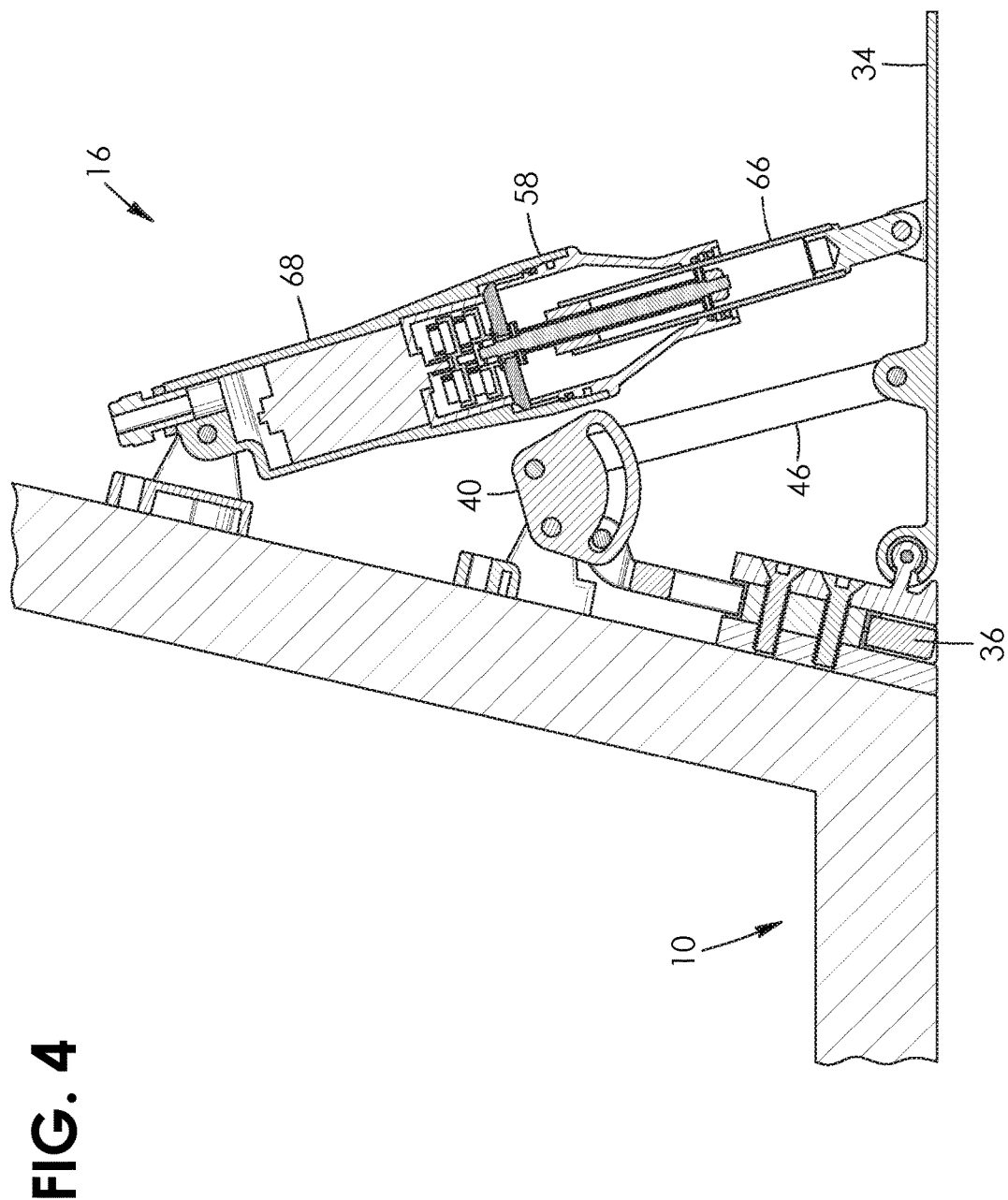
FIG. 4 is an elevation, partially sectional view of the combination trim tab and interceptor mounted on the transom of the marine vessel showing a trim tab and an interceptor blade each in an upward position relative to the marine vessel.
Figure 5:
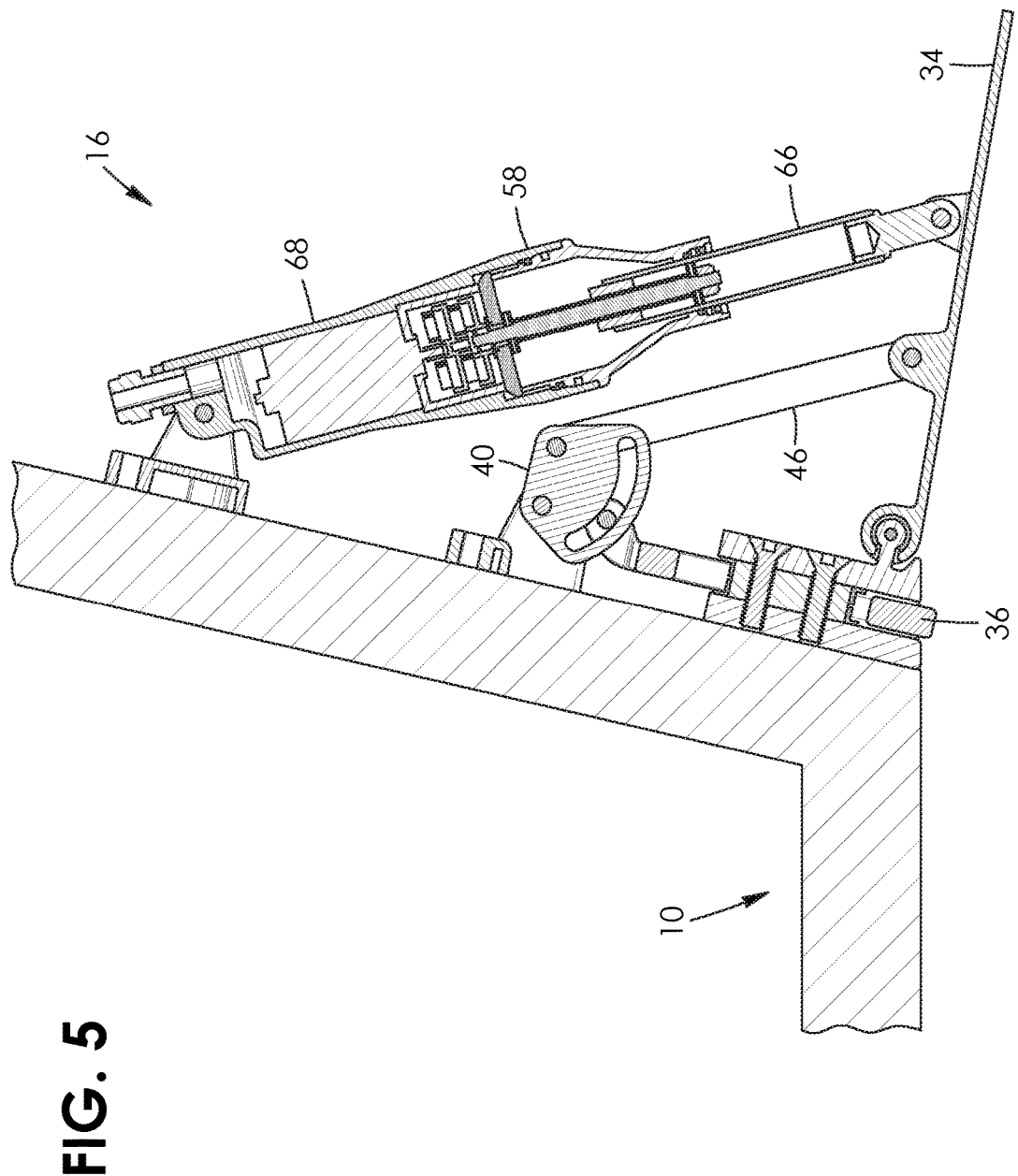
FIG. 5 is an elevation, partially sectional view of the combination trim tab and interceptor mounted on the transom of the marine vessel showing the trim tab and the interceptor blade each in an intermediate position relative to the marine vessel.
Figure 6:
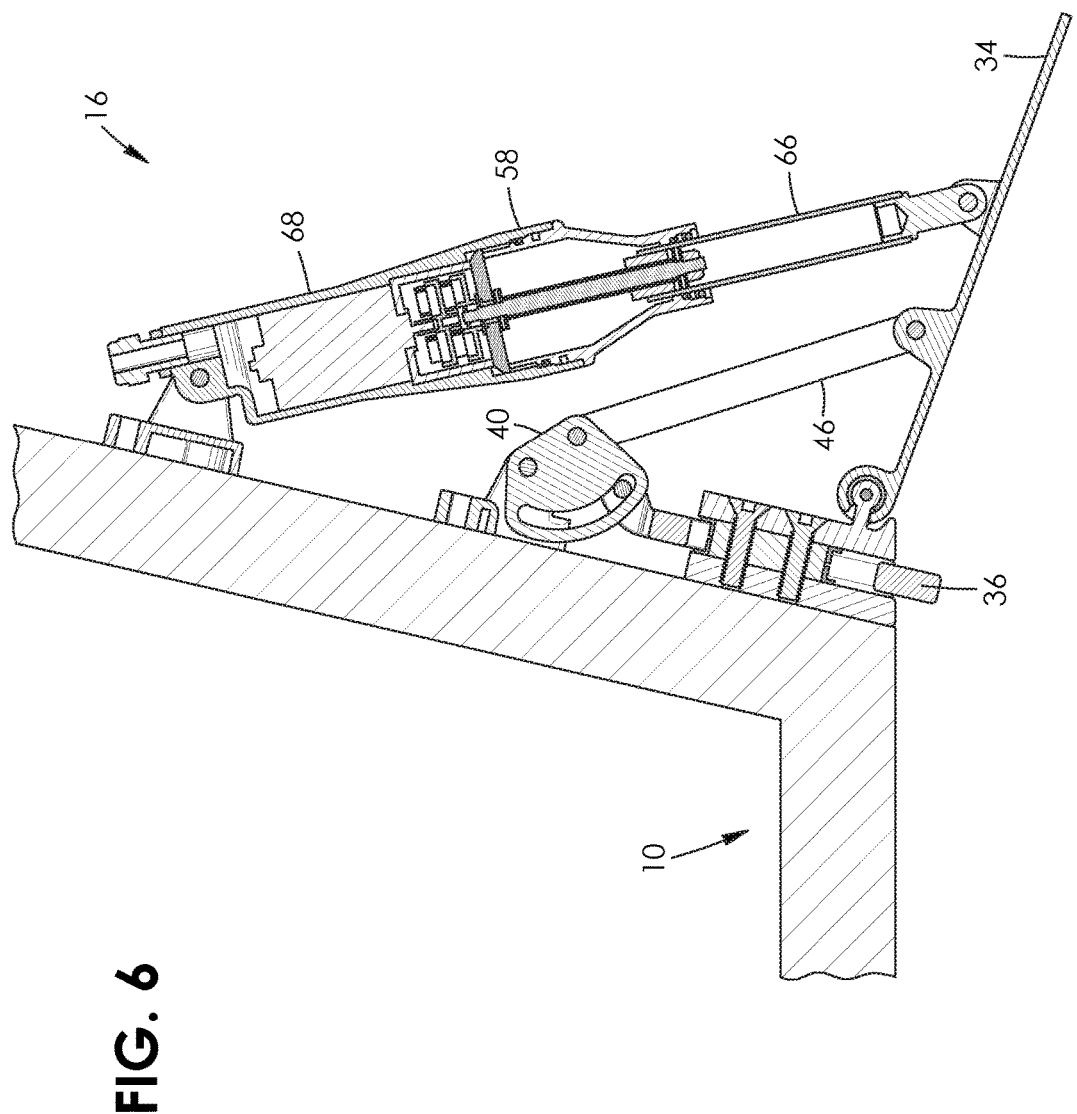
FIG. 6 is an elevation, partially sectional view of the combination trim tab and interceptor mounted on the transom of the marine vessel showing the trim tab and the interceptor blade each in a downward position relative to the marine vessel.

FIG. 4 shows the port combination trim tab and interceptor 16 in an upward position relative to the marine vessel 10. The port combination trim tab and interceptor 16 is deployable from the upward position relative to the marine vessel 10, through an intermediate position relative to the marine vessel 10 as shown in FIG. 5, to a downward position relative to the marine vessel 10 as shown in FIG. 6. In this example, a slope of the trim tab 34 in the upward position is 0 degrees, a slope of the trim tab 34 in the intermediate position is 10 degrees, and a slope of the trim tab 34 in the downward position is 20 degrees. Downward deployment of the port combination trim tab and interceptor 16 is done to compensate for changes in marine vessel speed and weight distribution. Hydrodynamic forces acting on the trim tab 34 result in an upward pressure which raises the stern and lowers the bow of the marine vessel.

Figure 7:
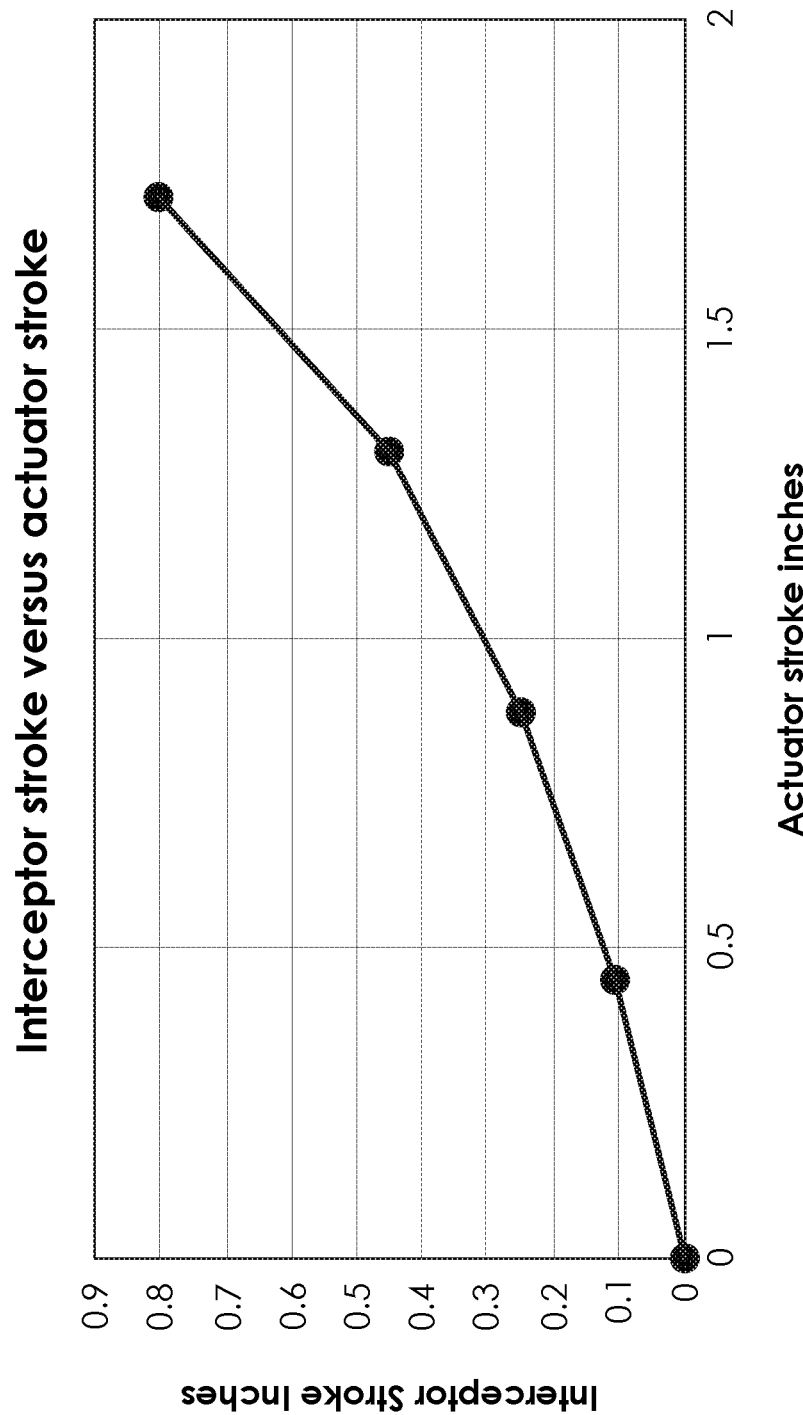
FIG. 7 is a graph showing a stroke of the interceptor blade versus a stroke of an actuator of the trim tab.

Downward deployment of the port combination trim tab and interceptor 16 is achieved by an output shaft 66 of the actuator 58 applying a force to the trim tab 34 as the output shaft extends out of a cylinder 68 of the actuator 58. Downward deployment of the trim tab 34 results in the links 46 and 48 applying a rotary force to the cam 40 which, in turn, applies a linear force to the interceptor blade 36 and results in the downward deployment of the interceptor blade 36. The cam 40 is configured so that the stoke of the actuator 58 is not linear with the stroke of the interceptor blade 36 during downward deployment of the trim tab 34 and downward deployment of the interceptor blade 36 as shown in FIG. 7. It is desirable for the cam 40 to be configured so that a short portion of the stroke of the output shaft 66 results in downward deployment of the interceptor blade 36. This results in a low pressure zone raising the stern of the marine vessel 10 and lowering the bow of the marine vessel.

Figure 8:
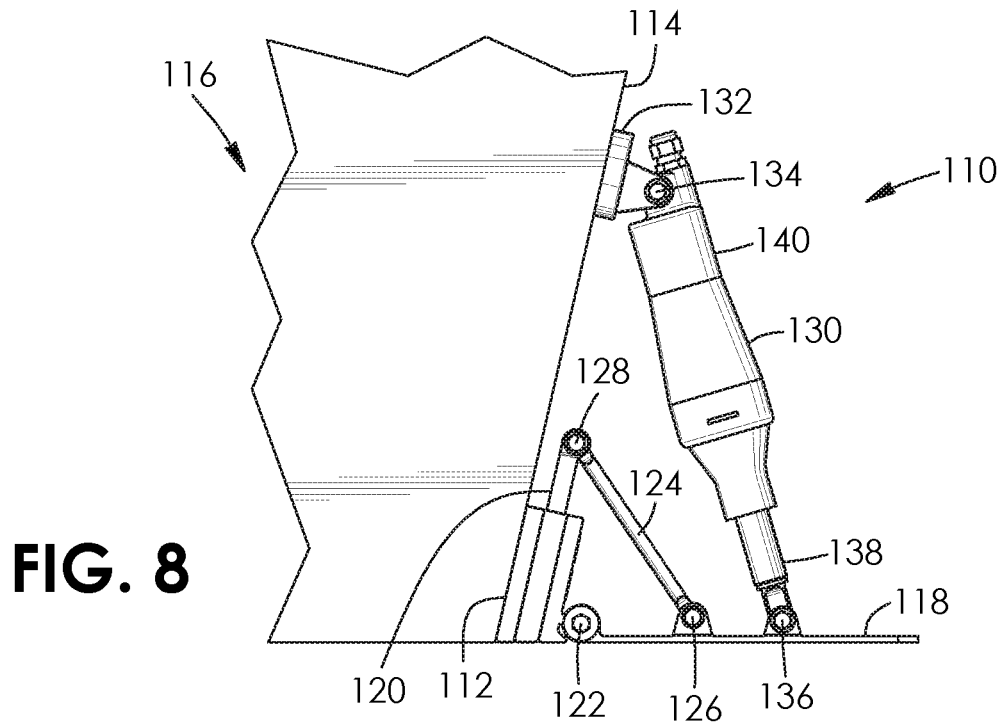
FIG. 8 is an elevation, partially sectional view of another combination trim tab and interceptor mounted on a transom of the marine vessel showing a trim tab and an interceptor blade each in an upward position relative to the marine vessel.
Figure 9:
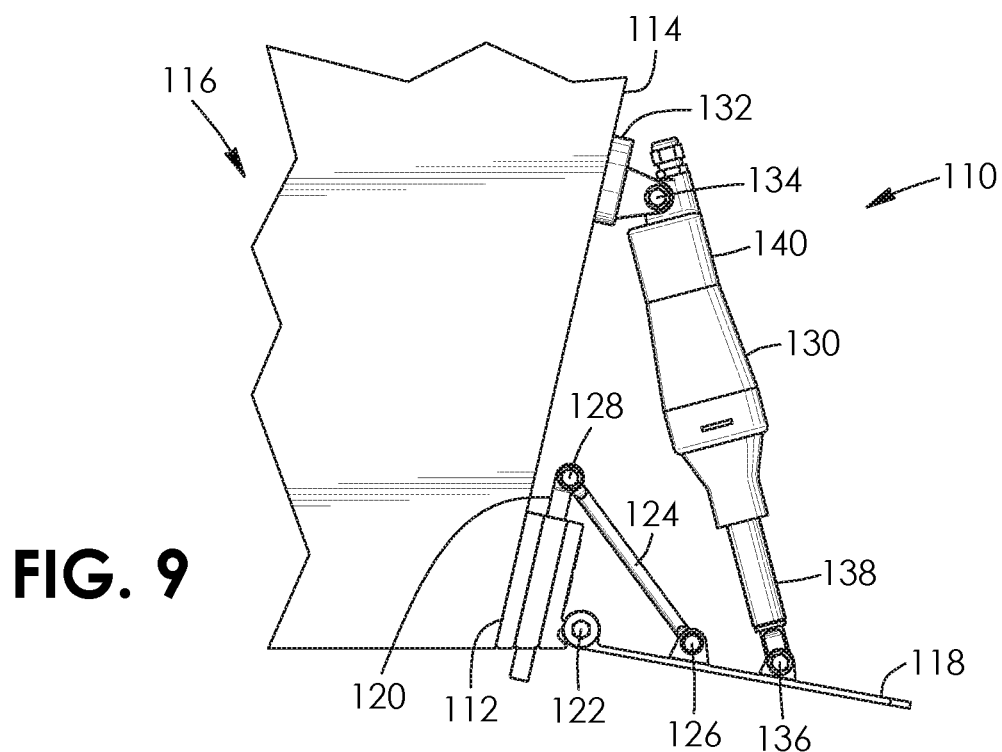
FIG. 9 is an elevation, partially sectional view of the another combination trim tab and interceptor mounted on the transom of the marine vessel showing the trim tab and the interceptor blade each in a downward position relative to the marine vessel.

It is however possible for the downward deployment of the trim tab and downward deployment of the interceptor blade to be linear. FIGS. 8 and 9 show another combination trim tab and interceptor 110 which includes a housing 112 mounted on a transom 114 of a marine vessel 116. There is a substantially planar trim tab 118 pivotably coupled to the housing 112 and an interceptor blade 120 reciprocatingly received by the housing 112. The trim tab 118 is pivotably coupled to the housing 112 by a pivot pin 122 and the interceptor blade 120 is coupled to the trim tab 118 by a link 124. The link 124 is pivotably connected to the trim tab 118 by a pivot pin 126 and the link 124 is pivotably connected to the interceptor blade 120 by a pivot pin 128.

There is an actuator 130 which imparts a force to the trim tab 118 so that the trim tab 118 pivots relative to the housing 112. In this example, the actuator 130 is an electromechanical linear actuator mounted on the transom 114 of the marine vessel 116 using a mount 132. The actuator 130 is pivotably connected to the mount 132 by a pivot pin 134 and the actuator 130 is pivotably connected to the trim tab 118 by a pivot pin 136. In other examples, any suitable actuator may be employed to actuate the trim tab. Downward deployment of the combination trim tab and interceptor 110 is achieved by an output shaft 138 of the actuator 130 applying a force to the trim tab 118 as the output shaft extends out of a cylinder 140 of the actuator. Downward deployment of the trim tab 118 results in the link 124 applying a linear force to the interceptor blade 120 and results in the downward deployment of the interceptor blade 120.

It will be understood by a person skilled in the art that many of the details provided above are by way of example only, and are not intended to limit the scope of the invention which is to be determined with reference to the following claims.

We claim:

1. A combination trim tab and interceptor for a marine vessel, comprising:
    a housing;
    a trim tab pivotably coupled to the housing;
    an interceptor blade reciprocatingly received by the housing;
    a link coupling the trim tab to the interceptor blade; and
    an actuator which actuates the trim tab to pivot relative to the housing, wherein pivoting of the trim tab relative to the housing results in the link applying a force to the interceptor blade, causing the interceptor blade to reciprocate relative to the housing.

2. A combination trim tab and interceptor as claimed in claim 1, wherein the link is pivotably connected to the trim tab and is also pivotably connected to the interceptor blade so the interceptor blade moves upwardly when the trim tab is pivoted upwardly by the actuator and the interceptor blade moves downwardly when the trim tab is pivoted downwardly by the actuator.

3. A combination trim tab and interceptor for a marine vessel, comprising:
    a housing;
    a trim tab pivotably coupled to the housing;
    an interceptor blade reciprocatingly received by the housing;
    a cam coupled to the trim tab and the interceptor blade, the cam being coupled to the trim tab by a link which applies a rotary force to the cam when the trim tab pivots relative to the housing, and the cam being coupled to the interceptor blade in a manner such that the interceptor blade functions as a cam follower; and
    an actuator which actuates the trim tab to pivot relative to the housing, wherein pivoting of the trim tab relative to the housing results in the cam applying a force to the interceptor blade, causing the interceptor blade to reciprocate relative to the housing.

4. A combination trim tab and interceptor as claimed in claim 3 wherein the cam is configured so a stroke of the interceptor blade and a stroke of the actuator are non-linear.

5. A combination trim tab and interceptor as claimed in claim 4, wherein the cam has a cam track and the interceptor blade is coupled to the cam by a pin which travels along the cam track.

6. A combination trim tab and interceptor as claimed in claim 5, wherein the cam track is an upwardly concave, curved slot.

7. A combination trim tab and interceptor as claimed in claim 3 wherein the actuator is an electromechanical linear actuator.

8. A marine vessel with a combination trim tab and interceptor mounted in a transom thereof, the combination trim tab and interceptor comprising:
    a housing mounted on the transom;
    a trim tab pivotably coupled to the housing;
    an interceptor blade reciprocatingly received by the housing;
    a link coupling the trim tab to the interceptor blade; and
    an actuator which actuates the trim tab to pivot relative to the housing, wherein pivoting of the trim tab relative to the housing results in the link applying a force to the interceptor blade, causing the interceptor blade to reciprocate relative to the housing.

9. A marine vessel as claimed in claim 8, wherein the link is pivotably connected to the trim tab and is also pivotably connected to the interceptor blade so the interceptor blade moves upwardly when the trim tab is pivoted upwardly by the actuator and the interceptor blade moves downwardly when the trim tab is pivoted downwardly by the actuator.

10. A marine vessel as claimed in claim 8 wherein the combination trim tab and interceptor further includes a cam, the cam being coupled to the trim tab by the link which applies a rotary force to the cam when the trim tab pivots relative to the housing, and the cam being coupled to the interceptor blade in a manner such that the interceptor blade functions as a cam follower.

11. A marine vessel as claimed in claim 10 wherein the cam is configured so a stroke of the interceptor blade and a stroke of the actuator are non-linear.

12. A marine vessel as claimed in claim 10 wherein the cam is mounted on the transom of the marine vessel.

13. A marine vessel as claimed in claim 10, wherein the cam has a cam track and the interceptor blade is coupled to the cam by a pin which travels along the cam track.

14. A marine vessel as claimed in claim 13, wherein the cam track is an upwardly concave, curved slot.

15. A marine vessel as claimed in claim 8 wherein the actuator is an electromechanical linear actuator.

* * * * *